March 10, 1964 E. G. RITTENHOUSE 3,124,439
COLLECTOR CELLS FOR ELECTROSTATIC PRECIPITATORS
Filed March 3, 1961 2 Sheets-Sheet 1
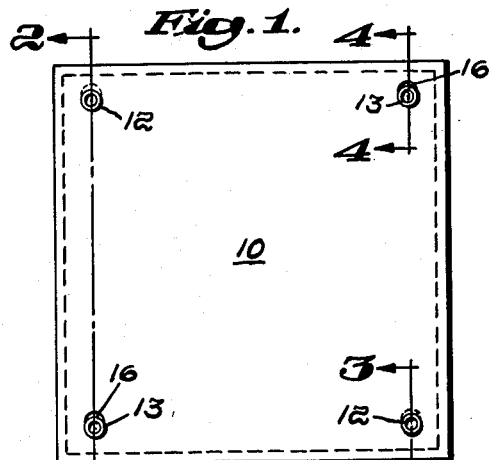
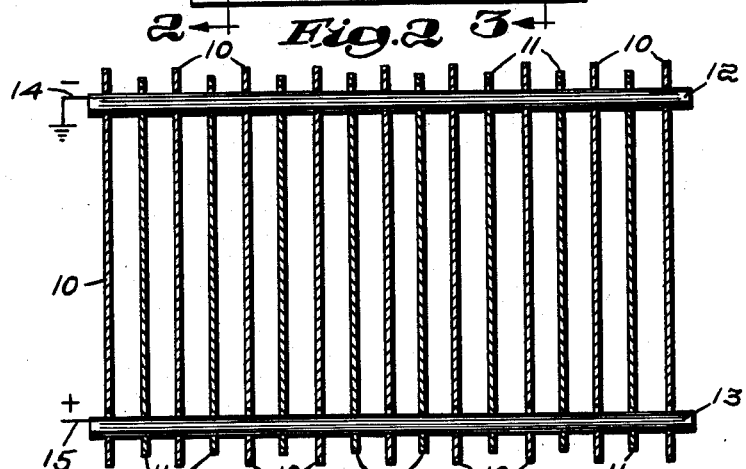
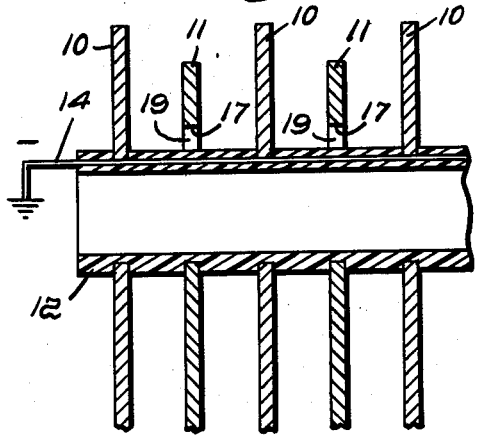
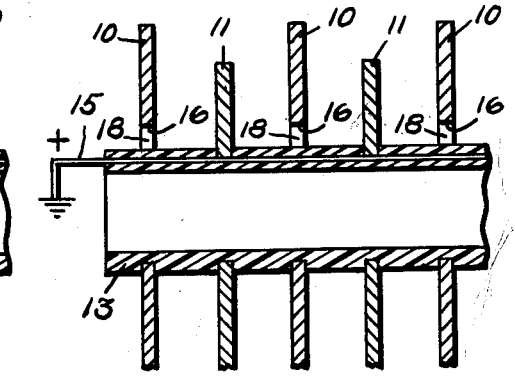
Inventor:
Earl G. Rittenhouse,
by Robert J. Palmer
Attorney March 10, 1964 E. G. RITTENHOUSE 3,124,439
COLLECTOR CELLS FOR ELECTROSTATIC PRECIPITATORS
Filed March 3, 1961 2 Sheets-Sheet 2

Inventor:
Earl G. Rittenhouse,
by Robert T. Palmer
Attorney

United States Patent Office 3,124,439
Patented Mar. 10, 1964

3,124,439
COLLECTOR CELLS FOR ELECTROSTATIC PRECIPITATORS
Earl G. Rittenhouse, Canton, Mass., assignor to Westinghouse Electric Corporation, East Pittsburgh, Pa., a corporation of Pennsylvania
Filed Mar. 3, 1961, Ser. No. 93,203
2 Claims. (Cl. 55—143)

This invention relates to collector cells of the spaced-apart, parallel, collector plate type for electrostatic precipitators.

Collector cells of the spaced-apart, parallel, collector plate type usually have alternate plates charged to a voltage which may be +10 kv., and have their other plates grounded and connected to the negative terminals of the D.C. power source. Adjacent ones of such plates therefore have a 10 kv. difference of potential therebetween. A widely used method of supporting and insulating such plates is that disclosed in the E. L. Richardson Patent No. 2,535,696, which issued Dec. 26, 1950, in which the charged plates of a collector cell are supported on one set of tie rods with spacers therebetween, and the grounded plates are supported on another set of tie rods with spacers therebetween. The tie rods and spacers of the charged plates extend through clearance openings in the grounded plates, and the tie rods and spacers of the grounded plates extend through clearance openings in the charged plates. The clearance openings provide the insulation between adjacent plates. Disadvantages of such a construction are the costs of the many tie rods and spacers required, and the labor required for assembly.

This invention reduces the number of tie rods required for supporting such plates, and eliminates the spacers by using tie tubes of thermo-setting plastic such as polyethylene or vinol. The plates are provided with openings in which the tubes are fitted, and the tubes are expanded until the edges of the plates around the openings are embedded in the outer portions of the tubes, as by passing a tapered, oversized, heated plug through the tubes.

Objects of this invention are to simplify the construction, and to reduce the manufacturing cost of plate-type collector cells of electrostatic precipitators.

This invention will now be described with reference to the annexed drawings, of which:

FIG. 1 is an end view of a collector cell embodying this invention;

FIG. 2 is a section along the lines 2—2 of FIG. 1;

FIG. 3 is an enlarged, fragmentary section along the lines 3—3 of FIG. 1;

FIG. 4 is an enlarged, fragmentary section along the lines 4—4 of FIG. 1;

Figure 5:
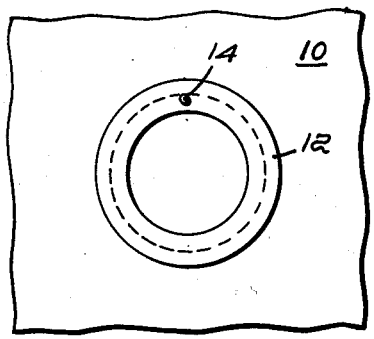
FIG. 5 is a greatly enlarged end view of one of the tubes with a portion of a collector plate therearound, the inner edge of the plate shown in dashed lines in contact with a conductor wire embedded in the wall of the tube.

FIGS. 1 and 2 show a collector cell having parallel, spaced-apart, rectangular collector plates, the end plates and alternate plates between the end plates being the grounded plates and being identified by the reference character 10. The other plates 11 are the charged plates. The grounded plates 10 are larger in width and depth than the charged plates so that cells can be stacked on top of each other with corresponding grounded plates in contact without shorting the charged plates, and for further separating the edges of adjacent plates.

The grounded plates 10 and the charged plates 11 are supported by thermo-setting plastic tubes 12 and 13 of polyethylene or vinol. The plates 10 have circular openings in which the tubes 12 are expanded so that the edges of the plates 10 around the circular openings are embedded in the tubes 12. The tubes 12 have wires 14 embedded therein which the plates 10 contact when the tubes 12 are expanded.

The plates 11 have circular openings in which the tubes 13 are expanded so that the edges of the plates 11 around the circular openings are embedded in the tubes 13. The tubes 13 have wires 15 embedded therein which the plates 11 contact when the tubes 13 are expanded.

The plates 10 where the tubes 13 pass through them have generally oval-shaped openings 16, the lower portions of which are circular, the edges of the plates 10 around such circular portions being embedded in the tubes 13 when the tubes 13 are expanded. The upper portions of the openings 16 provide clearance spaces 18 for insulatedly spacing the edges of the plates 10 adjacent to the wires 15 from the latter.

The plates 11 where the tubes 12 pass through them have generally oval-shaped openings 17, the lower portions of which are circular, the edges of the plates 11 around such circular portions being embedded in the tubes 12 when the tubes 12 are expanded. The upper portions of the openings 19 provide clearance spaces 19 for insulatedly spacing the edges of the plates 11 adjacent to the wires 14 from the latter.

The diagonally opposite tubes 12 thus have embedded therein circular edges of the plates 10, and have embedded therein parti-circular edges of the plates 11. Likewise, the diagonally opposite tubes 13 have embedded therein circular edges of the plates 11, and have embedded therein parti-circular edges of the plates 10. Thus all tubes support all plates.

Figure 6:
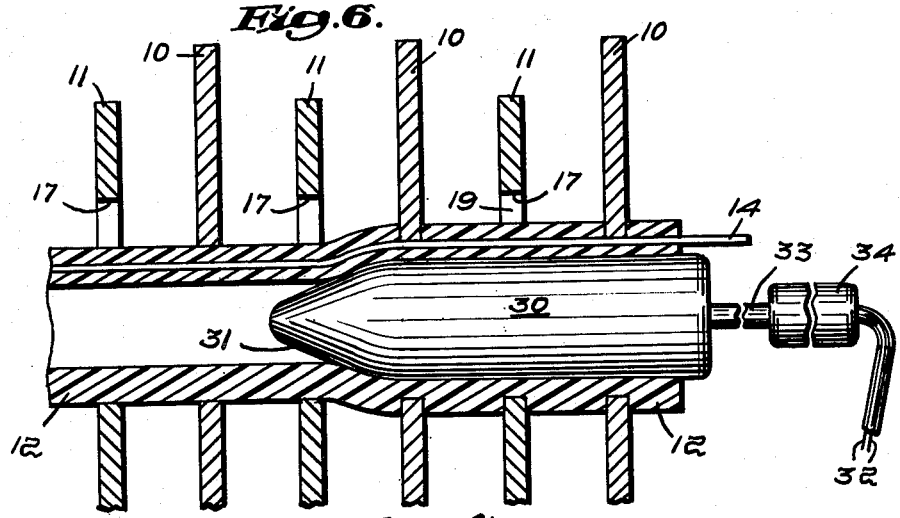
FIG. 6 is a greatly enlarged side section of one end portion of a tube having portions of plates therearound, and shows a tapered, heated plug expanding the tube so that the inner edges of the plates are embedded therein.
Figure 7:
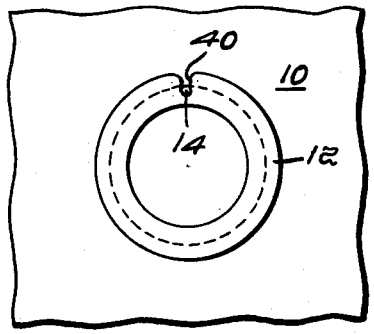
FIG. 7 is a view similar to FIG. 5, except that the wire is in a recess in the top of the tube.

FIG. 7 illustrates one way in which a tube can be expanded. The plates 10 and 11 held in alignment in a rack which is not shown, have a plastic tube 12 passed through aligned circular openings in the plates 10 and aligned oval-shaped openings 17 in the plates 11. The circular openings in the plates 10 have the same diameter as the outer diameter of the tube 12. The circular lower portions of the openings 17 in the plates 11 have the same diameter as the outer diameter of the tube 12. A plug 30 having a cylindrical body portion having a larger diameter than the inner diameter of the tube 12, and having a tapered nose 31, has an electric heater therein which is not shown, and which is connected by wires 32 extending through push-rod 33 and handle 34 of the plug 30 to an electric power source which is not shown. After the plug 30 has been heated to the proper temperature, the nose 31 of the plug 30 is inserted in an open end of the tube 12, and the plug is pushed into the tube. The heat from the nose causes the wall of the tube 12 to soften so that the over-size cylindrical body of the plug can enter the interior of the tube and push its wall out as shown by FIG. 6, so that the edges of the plates 10 around the tube are embedded in its wall, and the lower edges of the plates 11 around the tube are embedded in its wall. The embedded edges of the plates 10 contact the wire 14 which connect all of the plates 10 electrically together. The tubes 13 would be expanded in the same way.

The wires 14 and 15 can be embedded in the walls of the tubes 12 and 13 respectively, as shown by FIG. 5, when they are manufactured, or can be placed in a trough 40 cut in a wall of a tube as shown by FIG. 7. The dashed lines on FIGS. 5 and 7 show the circular edge of a plate 10 embedded in a tube 12.

What is claimed is:

1. A collector cell for an electrostatic precipitator comprising a plurality of parallel, aligned, spaced-apart, metal collector plates, alternate ones of said plates having aligned circular openings extending therethrough, a tube of thermo-setting plastic extending through said openings with the edges of said alternate plates around said openings embedded in the wall of said tube, a first conductor within said wall in contact with said edges, the others of said plates having openings through which said tube passes, the edges of said other plates around said last mentioned openings being spaced from said conductor, said other plates having aligned circular openings extending therethrough, a second tube of thermo-setting plastic extending through said last mentioned openings, the edges of said other plates around said last mentioned openings being embedded in the wall of said second tube, a second conductor within said wall of said second tube in contact with said edges of said other plates, said alternate plates having openings through which said second tube passes, the edges of said alternate plates around said last mentioned openings being spaced from said second conductor.

2. A collector cell for an electrostatic precipitator comprising a plurality of parallel, aligned, spaced-apart, metal collector plates, alternate ones of said plates having aligned circular openings extending therethrough, a tube of thermo-setting plastic extending through said openings with the edges of said alternate plates around said openings embedded in the wall of said tube, a first conductor within one side of said wall in contact with said edges, the other of said plates having aligned openings extending therethrough and through which said tube passes, said last mentioned openings having circular portions at the opposite side of said wall, the edges of said other plates around said circular portions embedded in said opposite side of said wall, said last mentioned openings having non-circular portions at said one side of said wall with the edges of said other plates around said non-circular portions spaced from said one side of said wall, said other plates having circular openings extending therethrough, a second tube of thermo-setting plastic extending through said last mentioned openings with the edges of said other plates around said last mentioned openings embedded in the wall of said second tube, and a second conductor in the side of the wall of said second tube in contact with said edges of said other plates, said alternate plates having aligned openings through which said second tube passes, said last mentioned openings having circular portions of the opposite side of said wall of said second tube, the edges of said alternate plates around said last mentioned circular portions embedded in said opposite side of said wall of said second tube, said last mentioned openings having non-circular portions of said one side of said second wall spaced from said one side of said second tube.

References Cited in the file of this patent

UNITED STATES PATENTS

| | | |
|---|---|---|
| 1,992,974 | Thompson | Mar. 5, 1935 |
| 2,789,656 | Richardson | Apr. 23, 1957 |